United States Patent Office 3,524,307
Patented Aug. 18, 1970

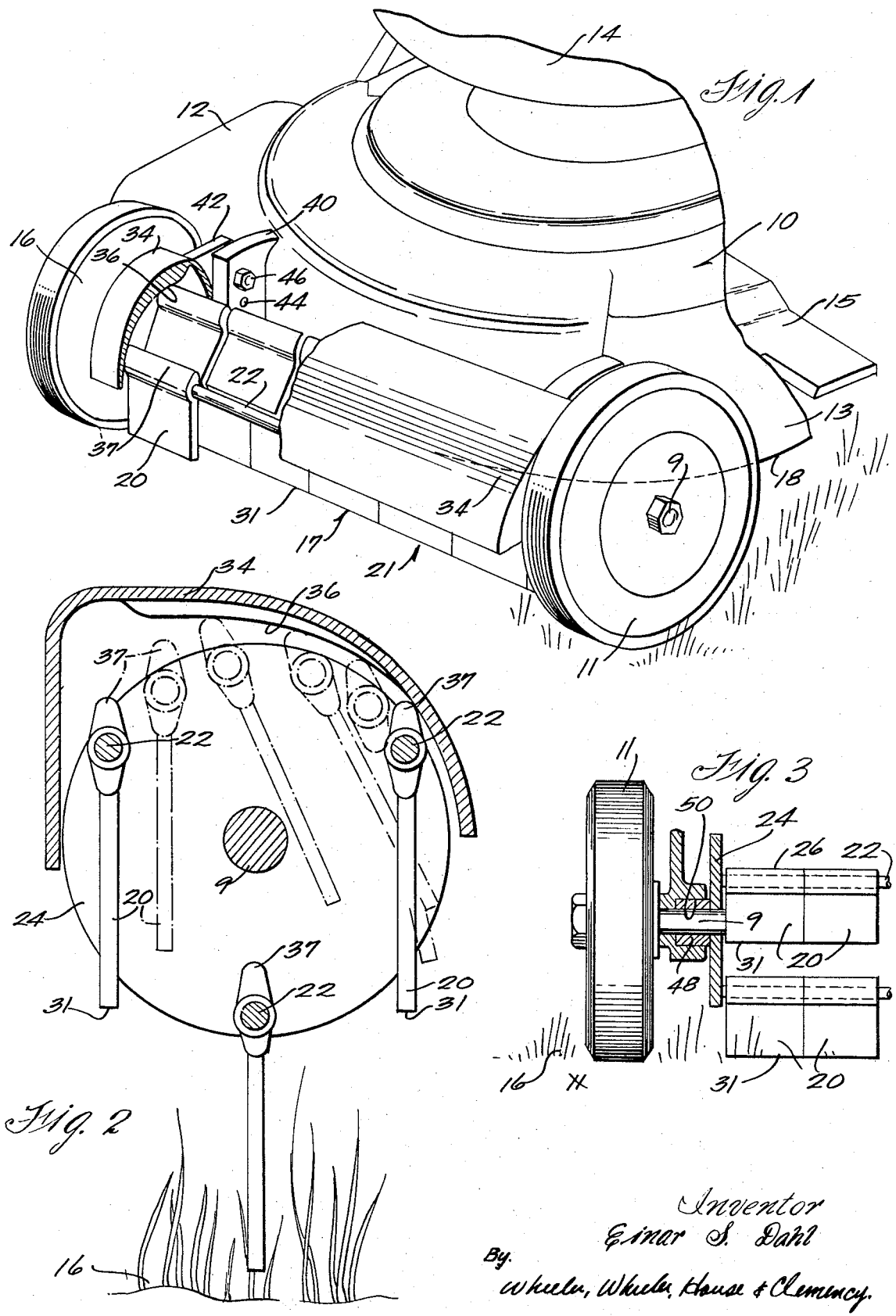

3,524,307
ROTATING FRONT GUARD FOR
ROTARY LAWNMOWERS
Einar S. Dahl, Galesburg, Ill., assignor to Outboard Marine Corporation, Waukegan, Ill., a corporation of Delaware
Filed Feb. 28, 1967, Ser. No. 619,360
Int. Cl. A01d 35/26
U.S. Cl. 56—25.4                    12 Claims

ABSTRACT OF THE DISCLOSURE

Disclosed herein is a rotary lawnmower with a rotating guard plate assembly which includes three transversely arranged rows of guard plates between the front wheels and parallel to the front wheel axles. The guard plates are pivotally carried by rods, with a plurality of guard plates on each rod. The rods are secured to end plates connected to the front wheel axles which rotate with mower movement. Mower movement imparts cycloidal motion of the rods and guard plates to provide a stepping action of the guard plates over the grass. Additional stepping effect is provided in one embodiment by cam follower extensions which are located on the guard plates and which engage a cam surface on the underside of a housing disposed above the rotating guard plate assembly. Such engagement tilts the lower tips of the guard plates upwardly and forwardly during a portion of the cycloidal path.

BACKGROUND OF INVENTION

In the operation of rotary lawnmowers, various hazards are present endangering the mower operator and bystanders because of possible ejection of missiles, such as stones or pebbles, from beneath the mower housing, the missiles being impelled by the rotating cutting blade. Normally, in a rotary mower the plane or track of the cutting blade is near the lower edge of the blade housing and the clearance area between the lower edge of the housing and the ground varies between one and three inches as the housing is raised or lowered for different depths of cut, making it possible for objects to be ejected from beneath the housing. When providing an effective wall or guard at the front of a mower it is desirable to prevent drag on the ground and interference with mower movement. The present invention provides protection at the front of the mower housing and can be utilized with the ventions disclosed in the above applications.

SUMMARY OF INVENTION

In accordance with the invention, protection from missile ejection forwardly of a rotary lawnmower is afforded by a rotating guard plate assembly which prevents a continuous wall in the clearance area, region or zone between the lower edge of the housing and the ground, and which reduces the clearance to a minimum, independent of vertical height adjustment of the mower housing to vary the depth of cut. The rotary guard plate assembly also affords minimum drag and resistance to mower movement. The guard assembly includes a plurality of rows of guard plates pivotally carried on rods, the rods and plates being parallel to the axes of wheel rotation and transverse to the direction of mower movement. The rows of plates form longitudinal walls which are rotated into the clearance zone between the ground and the lower edge of the housing. As the mower moves forwardly, cycloidal motion of the plates results in a stepping action of the plates over the glass, thus reducing any drag or interference with mower movement caused by engagement with the ground, but providing continuous shielding in the frontal area of the mower.

In the preferred embodiment, additional stepping effect of the guard plates is provided by cam follower extensions on each of the guard plates. The extensions engage a cam track or cam surface on the underside of a guard plate housing. Upon engagement of the cam follower extensions with the cam surface, the guard plates are pivoted or angularly displaced upwardly and forwardly, above and over the grass.

Further objects and advantages of the present invention will become apparent from the following description and accompanying drawings.

DRAWINGS

FIG. 1 is a partially broken away perspective view of a rotary mower embodying various of the features of the invention.

FIG. 2 is an enlarged and partially sectional end view of the guard plate assembly.

FIG. 3 is a front view in fragmentary section of the mower shown in FIG. 1.

DESCRIPTION OF THE PREFERRED EMBODIMENT

In the drawings, FIG. 1 discloses a rotary mower which is generally designated 10, and which has a blade housing 12 with a depending peripheral skirt 13, the housing 12 supporting an engine 14 which rotates a cutting blade 15 within housing 12. The housing is supported in part for travel in adjacent relation to the ground by front wheels 11 which can be fixedly secured to axles 9.

In accordance with the invention there is provided a rotating guard plate assembly 17 which reduces the clearance area between the lower housing edge 18 of the skirt and the ground 16, which maintains a generally constant clearance irrespective of vertical height adjustment of the housing 12 to vary the height of cut, and which affords minimum drag on the mower caused by ground engagement. The guard plate assembly 17 includes a plurality of relatively narrow in width guard plates 20 which are serially arranged and pivotally carried on each of three rods 22 to form three longitudinal walls 21 transverse to the direction of mower movement, the walls being parallel to the axles 9.

Drag on the mower, caused by the grass, ground features, on contour, is minimized by rotating the walls 21 formed by the plates to provide a stepping or walking action of the plates 20 over the grass 16. In the specifically disclosed construction, the stepping action is afforded by the cycloidal motion or path of the guard plates during mover movement.

In accordance with the invention, means are provided for pivotally supporting the guard plates on a pivotal axis and for moving the pivotal axis into and out of the vertically extending zone or region between the lower edge 18 of the blade housing 12 and the ground. In the disclosed construction such means includes three parallel rods 22 secured to generally circular end plates 24, the rods 22 being arranged equidistantly apart at 120° around the periphery or margin of the plates 24.

Various arrangements can be employed for rotating the guard plate assembly. In the disclosed construction, the end plates 24 are fixed to axles 9, thus the end plates 24 rotate with the front wheels 11, causing cycloidal motion of the rods 22 and guard plates 20. The rods 22 are in eccentric parallel relation to the axles 9. As the mower moves forwardly, the cycloidal motion of the rods 22 and the guard plates 20 provides a stepping action of the guard plates, while contiuously presenting and removing a continuous longitudinal wall 21 of guard plates 20 in the zone between the lower edge of the housing 12 and the ground 16.

In the preferred embodiment, drag is further minimized by pivoting or angularly displacing the guard plates 20 relative to the cycloidal path about rods 22 which provide a pivotal axis parallel to the mower wheel axis. The guard plates are angularly displaced during a portion of one revolution of the mower wheels 11 or a portion of the cycloidal path to pivot the tips 31 of the plate upwardly as the wall of plates 21 is raised from the clearance area. Such angular displacement raises the guard plate tips 31 over the grass or ground 16. The angular displacement of the plates 20 along the cycloidal path is provided by a cam action resulting from engagement of cam follower extension 37 on each of the guard plates 20 with a cam surface 36 on the underside of an arcuate guard plate housing 34 which is part of the guard plate assembly 17. As shown in FIG. 2, upon forward movement of the mower and accordingly rotation of the guard plates, the cam follower extensions 37 engage cam surface 36, and the guard plates 20 pivot on the rods 22 with the guard plate tips 31 being raised above the grass. Upon release of the extensions 37 from engagement with cam surface 36 the guard plates swing or pivot downwardly to a generally vertical position.

Desirably, the guard plates 20 are sufficiently narrow in width so that five or six of the plates will be carried by each rod 22. Some of the advantages of the present invention can be obtained by using one wide plate on each rod, with the wide plate spanning the gap between the front wheels 11. Since, narrow guard plates 20 have a lower polar moment of inertia and frictional resistance in the pivotal connection than a wide guard plate, the narrow guard plates 20 pivot freely in response to ground engagement, thus affording less drag or interference with mower movement as compared with one wide guard plate.

Each guard plate 20 should have a sufficient mass so that it will depend substantially vertically in the absence of ground engagement, unaffected by high velocity air flow and beneath the mower housing. The guard plates 20 should be of a length less than the distance between two rods 22 so that the guard plates can clear the rods 22 and swing between the rods during mower movement.

Four rods, with four rows of guard plates could be used, but three rows of plates 20 give advantageous coverage in the clearance area. In a typical design with the use of three rows of plates, the clearance area between the lower tips 31 of the guard plates and the ground 16 varies between ¼ to one inch.

Means are provided for vertically adjustably supporting the blade housing 12 above the front wheel axles 9 to afford selective height adjustment of the blade housing 12 and cutting blade without affecting the height of guard plate assembly 17 above the ground 16. In the disclosed construction, such means comprises two brackets 40 extending forwardly of the blade housing 12 and mounting ears 42 extending rearwardly of the guard housing 34. Vertical adjustment of the mower height to vary height of cut is afforded by a series of bolts 46 located in vertically aligned apertures 44 in brackets 40.

In the preferred embodiment utilizing guard plate housing 34, the axles 9 are rotatably carried in bearings 48 which are supported or carried in annular recesses 50 in housing 34.

In operation of the mower 10, missiles which may be impelled forwardly by the high velocity cutting blade will strike and be contained or deflected by the guard plates 20. Such striking will displace the guard plates angularly about their pivotal axis absorbing all or a substantial portion of the kinetic energy of the missiles.

Various of the features of the invention are set forth in the following claims.

What is claimed is:

1. A lawnmower comprising a cutting blade housing having a lower edge spaced from the ground, an engine supported by said housing and having an output shaft carrying a cutting blade, wheels supporting said housing for travel in adjacent relation to the ground, at least one guard plate, means for pivotally supporting said guard plate on a pivotal axis between said wheels, and for moving said pivotal axis into and from a zone extending between the lower edge of said housing and the ground.

2. A lawnmower in accordance with claim 1 wherein said means for pivotally supporting said guard plate on a pivotal axis between said wheels and for moving said pivotal axis into and from a zero extending between the lower edge of said housing and the ground affords cycloidal motion of said pivotal axis and raises said guard plate above the grass during a portion of the cycloidal motion.

3. A lawnmower including a housing, an engine supported by said housing and having an output shaft connected to a cutting blade, front wheels to support said housing for travel in adjacent relation to the ground, axles fixedly secured to said front wheels, at least one guard plate, means for supporting said guard plate on a pivotal axis between said front wheels and for moving said axis in a cycloidal path during movement of said mower wheels, and for angularly displacing said guard plate a predetermined distance about said pivotal axis relative to said cycloidal path during a portion of each revolution of said mower wheels to clear the ground and grass.

4. A lawnmower including a housing, an engine supported by said housing and having an output shaft carrying a cutting blade, wheels to support said housing for travel in adjacent relation to the ground, said axles being fixedly secured to said front wheels, a rod, a guard plate pivotaly connected to said rod, means for supporting and moving said rod in a cycloidal path into and from a zone forwardly of said mower housing and for angularly displacing said guard plate upwardly and forwardly about said rod during a portion of said cycloidal path.

5. A rotating guard assembly for a lawn mower comprising end plates, a rod connecting said end plates, a guard plate pivotally connected at one end to said rod, and means adapted for connecting said end plates to a lawn mower for rotation of said end plates for movement of said guard plate into and from a zone forwardly of the mower.

6. A lawnmower comprising a housing, an engine supported by said housing, wheels supporting said housing for travel in adjacent relation to the ground, axles fixedly secured to said wheels, end plates located between said wheels and fixedly secured to said axles for rotation therewith, a rod disposed in eccentric parallel relation to said axles and connecting said end plates, and a guard plate pivotally connected at one end to said rod.

7. A lawnmower in accordance with claim 6 wherein said end plates are connected by three rods spaced equidistantly around the margin of said end plates and each of said rods pivotally carries at least one guard plate.

8. A lawnmower in accordance with claim 6 wherein said end plates are connected by three rods spaced equidistantly around the margin of said end plates and each of said rods pivotally carries a plurality of guard plates.

9. A lawnmower in accordance with claim 8 wherein said guard plates are of a length less than the length length of a line connecting any two of said rods.

10. A lawnmower in accordance with claim 6 including means for vertically adjustably supporting said housing relative to said axles to afford selective height adjustment of said blade housing and said cutting blade.

11. A lawnmower in accordance with claim 10 wherein said means for vertically adjustably supporting said housing above said axles to afford selective height adjustment of said housing and said cutting blade comprises two brackets extending forwardly from said blade housing, a guard plate housing having mounting ears extending rearwardly, bearings carried by said guard plate housing, said front wheel axles being journaled in said bearings, and means adjustably securing said mounting ears to said forwardly extending brackets.

12. A lawnmower including a housing, an engine supported by said housing, wheels to support said housing for travel in adjacent relation to the ground, axles fixedly secured to said wheels, end plates located between said wheels and fixedly secured to said axles for rotation therewith, at least one rod connecting said end plates, said rod being parallel to said axles, a guard plate pivotally connected to said rod, said guard plate including a cam follower extension projecting above said rod, a guard plate housing above said guard plate, said housing having an arcuate wall defining a cam surface, said cam surface cooperating with said cam follower on said plate to angularly displace the lower edge of said guard plate upwardly and forwardly about said rod during a portion of each revolution of said mower wheels.

References Cited
UNITED STATES PATENTS

| | | | |
|---|---|---|---|
| 2,982,079 | 5/1961 | Schesser | 56—25.4 |
| 2,242,922 | 5/1941 | Poynter | 56—25.4 X |
| 2,489,516 | 11/1949 | Booth | 56—226 |
| 2,694,894 | 11/1954 | Linscheio | 56—226 |
| 2,984,961 | 5/1961 | Judkins | 56—25.4 X |
| 3,191,369 | 6/1965 | Cowan | 56—25.4 |
| 3,195,297 | 7/1965 | Weiland | 56—25.4 |
| 3,205,643 | 9/1965 | Dunham | 56—26 |

RUSSELL R. KINSEY, Primary Examiner

U.S. Cl. X.R.

56—255